Aug. 1, 1944.  B. F. BROWN  2,354,737
COMBINATION SCALE
Filed March 6, 1943
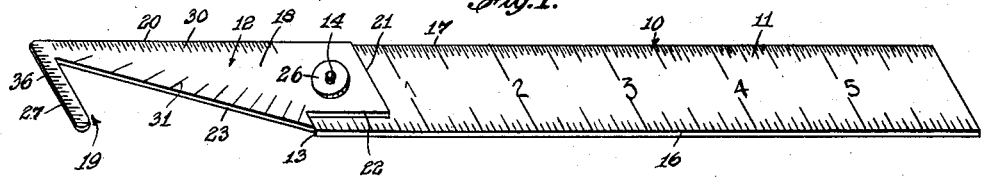
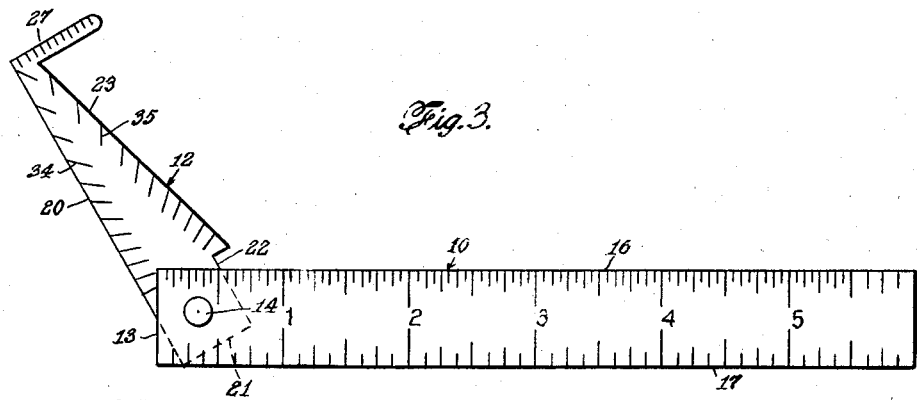
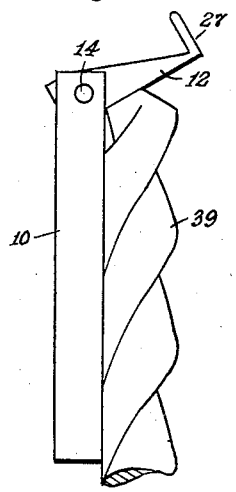
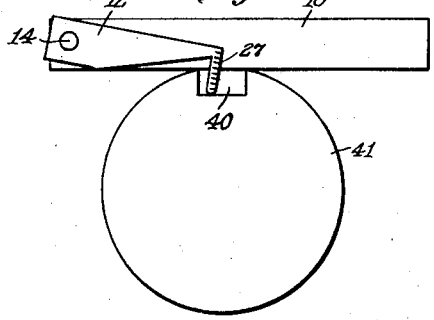
INVENTOR.
BEN FRANK BROWN
BY
Carl Miller
ATTORNEY.

Patented Aug. 1, 1944

2,354,737

UNITED STATES PATENT OFFICE 2,354,737

COMBINATION SCALE

Ben Frank Brown, Zanesville, Ohio

Application March 6, 1943, Serial No. 478,187

10 Claims. (Cl. 33—75)

This invention relates to combination scales and the like machinists' or engineers' instruments.

An object of this invention is to provide a single instrument of the character described which may be used as (a) a depth gauge, (b) a height gauge, (c) outside calipers, (d) hook scale, (e) outside square, (f) inside square, (g) drill grinding gauge, (h) bevel protractor, (i) three separate scales of different length, (j) for grinding 30° threading tool, and setting same at proper angle on the lathe, (k) to measure small angles as clearance on cutting tools.

Another object of this invention is to provide a compact, unitary tool or instrument of the character described which shall be relatively inexpensive to manufacture, easy to manipulate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

Fig. 1 is a perspective view of an instrument or scale embodying the invention;

Fig. 2 is a side edge view thereof;

Fig. 3 is a side elevational view of said instrument;

Fig. 4 is a side elevational view of the improved instrument used as a drill grinding gauge; and Fig. 5 is a side elevational view of said instrument used as a depth gauge.

Referring now in detail to the drawing, 10 designates a scale or instrument embodying the invention. The same comprises a long scale 11 and a smaller scale 12 pivoted thereto.

Scale 11 may be a standard 6" steel scale. Adjacent one end edge 13 it is provided with a pivot pin 14 having a threaded stem. The pin or rivet 14 is preferably flush with one surface of the scale 12. The distance of the pivot pin 14 to edge 13 is equal to the distance of said pivot pin from the upper and lower edges 16, 17 of scale 11. Thus for a ¾" wide scale the pivot is ⅜" from the edges 13, 16, 17.

The smaller scale 12 is preferably thinner than scale 11. It has a body 18 and an arm 19 extending at right angles thereto. Body portion 18 has a longitudinal edge 20, an end edge 21 extending at right angles thereto, an edge 22 parallel to edge 20, and an edge 23 forming an acute angle with said edge 20. Body portion 18 is formed with an opening receiving pivot pin 14, located a distance from edges 20 and 21 equal to the distance pivot pin 14 is spaced from edges 13, 16, 17. A knurled nut 26 screwed to pin 14 serves to tighten member 12 to scale 11.

Arm 19 extends from the outer end or apex portion of body 20. It has an outer edge 27 parallel to edge 21 and of a length equal to the width of scale 11.

On one face of body 18, adjacent edge 20 is a standard scale or graduation 30 for measuring length. Adjacent edge 23 on the same face is a scale 31 measuring angles which said edge makes with edge 16 of scale 11.

On the other face of body 18 are scales 34, 35 graduated for angles edges 20, 23 make with edges 17, 16 of scale 11.

Arm 19 is also provided with a scale 36.

In Fig. 4 the instrument 10 is shown when used as a drill grinding gauge for drill 39. In Fig. 5 there is illustrated the use of the instrument as a depth gauge for a keyslot 40 in shaft 41.

It may also be used as a height gauge in a manner similar to that shown in Fig. 5.

It may be used as an outside calipers, the shaft to be measured being placed between the tip of arm 19 and scale 11. When member 12 is moved into alignment with scale 11, the instrument may be used as a hook scale, arm 19 being the hook, and the combined lengths of body 18 and scale 11 can be used. When member 12 is moved to positions at right angles to scale 11, the instrument may be used as inside and outside squares.

Due to graduations 31, 34 and 35 the device can be used as a bevel protractor. Furthermore there are three scales of different length, to wit: scale 11, body 18 (scale 30) and arm 19 (scale 36). These may be used separately as space permits.

The instrument can also be used as will be obvious for grinding 30° threading tool bits and for setting the same at a proper angle on a lathe.

The heel 40 may be used to measure small angles as clearance on cutting tools.

Member 12 may also be swung down and used as a clip when carrying the instrument in the pocket.

It will be noted that edge 20 can be aligned with edges 17 or 13. Furthermore edge 21 can be aligned with edges 16 or 17.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. An instrument of the character described, comprising a scale, a member pivoted to one end of the scale, said member having a body of less length than the scale, and having an arm extending at right angles to the body and of less length than said body, said body having graduations at opposite edges of said body giving angles of said edges relative to opposite edges of said scale.

2. An instrument of the character described, comprising a scale, a member pivoted to one end of the scale, said member having a body of less length than the scale, having an arm extending at right angles to the body and of less length than said body, length graduations on said body, and length graduations on said arm, and graduations on an edge of said body giving angles of said edge to an edge of said scale.

3. An instrument of the character described, comprising a scale, a member pivoted to one end of the scale, said member having a body of less length than the scale, having an arm extending at right angles to the body and of less length than said body, length graduations on said body, length graduations on said arm, said body having a longitudinal edge and an opposite edge forming an acute angle with said longitudinal edge, and graduations at said opposite edge giving angles of said edge to said scale.

4. An instrument of the character described, comprising a scale, a member pivoted to one end of the scale, said member having a body of less length than the scale, and having an arm extending at right angles to the body and of less length than said body, length graduations on said body, and length graduations on said arm, the length of said arm being equal to the width of said scale.

5. An instrument of the character described, comprising a scale, a member pivoted to one end of the scale, said member having a body of less length than the scale, having an arm extending at right angles to the body and of less length than said body, length graduations on said body, length graduations on said arm, said body having a longitudinal edge and an opposite edge forming an acute angle with said longitudinal edge, and graduations at said opposite edge giving angles of said edge to said scale, the length of said arm being equal to the width of said scale.

6. An instrument of the character described, comprising a scale, a flat member pivoted thereto, and having a longitudinal edge adapted to be aligned with one longitudinal edge of said scale, said member having an edge at right angles to its said longitudinal edge, and an edge opposite said longitudinal edge and forming an acute angle thereto, said member having an arm at its outer apex end extending at right angles to the longitudinal edge of said member.

7. An instrument of the character described, comprising a scale, a flat member pivoted thereto, and having a longitudinal edge adapted to be aligned with one longitudinal edge of said scale, said member having an edge at right angles to its said longitudinal edge, an edge opposite said longitudinal edge and forming an acute angle thereto, said member having an arm at its outer apex end extending at right angles to the longitudinal edge of said member, the pivot being located equal distances from opposite longitudinal edges of said scale and an end edge of said scale, and a like distance from the longitudinal edge of said member and from the edge of said member at right angles to its said longitudinal edge.

8. An instrument of the character described, comprising a scale, a flat member pivoted thereto, and having a longitudinal edge adapted to be aligned with one longitudinal edge of said scale, said member having an edge at right angles to its said longitudinal edge, an edge opposite said longitudinal edge and forming an acute angle thereto, said member having an arm at its outer apex end extending at right angles to the longitudinal edge of said member, the pivot being located equal distances from opposite longitudinal edges of said scale and an end edge of said scale, a like distance from the longitudinal edge of said member and from the edge of said member at right angles to its said longitudinal edge, and length scale graduations at said longitudinal edge of said member, and on said arm.

9. An instrument of the character described, comprising a scale, a flat member pivoted thereto, and having a longitudinal edge adapted to be aligned with one longitudinal edge of said scale, said member having an edge at right angles to its said longitudinal edge, an edge opposite said longitudinal edge and forming an acute angle thereto, said member having an arm at its outer apex end extending at right angles to the longitudinal edge of said member, the pivot being located equal distances from opposite longitudinal edges of said scale and an end edge of said scale, a like distance from the longitudinal edge of said member and from the edge of said member at right angles to its said longitudinal edge, and length scale graduations at said longitudinal edge of said member, and on said arm, and angle graduations at said opposite edge of said member.

10. An instrument of the character described, comprising a scale, a flat member pivoted thereto, and having a longitudinal edge adapted to be aligned with one longitudinal edge of said scale, said member having an edge at right angles to its said longitudinal edge, an edge opposite said longitudinal edge and forming an acute angle thereto, said member having an arm at its outer apex end extending at right angles to the longitudinal edge of said member, the pivot being located equal distances from opposite longitudinal edges of said scale and an end edge of said scale, a like distance from the longitudinal edge of said member and from the edge of said member at right angles to its said longitudinal edge, and length scale graduations at said longitudinal edge of said member, and on said arm, and angle graduations at said opposite edge of said member, said member being thinner than said scale.

BEN FRANK BROWN.